United States Patent
Considine et al.

(10) Patent No.: US 7,809,082 B2
(45) Date of Patent: Oct. 5, 2010

(54) GMSK/EDGE MODULATOR WITH SWITCHING TRANSITION SMOOTHING

(75) Inventors: Peter Brendan Considine, Peymeinade (FR); Jean-Christophe Lombardo, Sospel (FR); Céline Pignatari, Vence (FR)

(73) Assignee: Texas Instruments Incorporated, Dallas, TX (US)

( * ) Notice: Subject to any disclaimer, the term of this patent is extended or adjusted under 35 U.S.C. 154(b) by 883 days.

(21) Appl. No.: 11/615,667

(22) Filed: Dec. 22, 2006

(65) Prior Publication Data
US 2007/0164834 A1    Jul. 19, 2007

Related U.S. Application Data

(60) Provisional application No. 60/867,705, filed on Nov. 29, 2006.

(30) Foreign Application Priority Data
Dec. 23, 2005    (EP)    ................................... 05292792

(51) Int. Cl.
H04L 27/12    (2006.01)
(52) U.S. Cl. ..................................... 375/302

(58) Field of Classification Search .................. 375/295, 375/302, 305, 308; 455/102
See application file for complete search history.

(56) References Cited

U.S. PATENT DOCUMENTS

| 2005/0215206 A1* | 9/2005 | Granstrom et al. ........... 455/102 |
| 2005/0281353 A1* | 12/2005 | Huang et al. ................. 375/295 |
| 2005/0286653 A1* | 12/2005 | Lai et al. ..................... 375/308 |
| 2008/0310543 A1* | 12/2008 | Helfenstein et al. ......... 375/295 |

* cited by examiner

*Primary Examiner*—Don N Vo
(74) *Attorney, Agent, or Firm*—Ronald O. Neerings; Wade James Brady, III; Frederick J. Telecky, Jr.

(57) ABSTRACT

To minimize abrupt changes in modulated signal amplitude when switching between modulation types in a multi-modulation system, a "smoothing" circuit is used. When the modulation type is changed in a multi-slot modulation, the last symbol of the previous slot is overwritten and modulation is controlled by a smoothing circuit during the time of the final symbol of the previous slot to effect the trajectory smoothing. The IQ-plane is divided into two (or more) zones, each with an associated safe point. After the next-to-last symbol is modulated, modulation is made to jump to the safe point associated with the zone and modulation continues to a starting point. From the starting point, the next slot can be modulated using the new modulation type.

18 Claims, 6 Drawing Sheets

GMSK/EDGE MODULATOR WITH SWITCHING TRANSITION SMOOTHING

CROSS-REFERENCE TO RELATED APPLICATIONS

This application claims the benefit of the filing date of provisional application U.S. Ser. No. 60/867,705, filed Nov. 29, 2006, entitled "GMSK/EDGE MODULATOR WITH SWITCHING TRANSITION SMOOTHING", which is incorporated by reference herein, and claims priority under 35 U.S.C. 119(b) to EP 05292792.8, filed Dec. 23, 2005.

STATEMENT OF FEDERALLY SPONSORED RESEARCH OR DEVELOPMENT

Not Applicable

BACKGROUND OF THE INVENTION

1. Technical Field

This invention relates in general to digital communications and, more particularly, to a GMSK/EDGE modulator with transition smoothing.

2. Description of the Related Art

EGPRS (Enhanced General Packet Radio Service) standard allows mixing consecutive GMSK and 8PSK modulations slot-by-slot within a single TDMA time-frame. To switch between modulation types, the modulator is reset. As shown in FIG. 1, if the modulator is reset in GMSK mode, the I-vector is set to its maximum value, while the Q-vector is set to 0, i.e., the modulator is set to zero phase. If the modulator is reset in 8PSK mode, the phase is initialized close to 0 degrees at a slightly smaller amplitude.

The amplitudes of the signal correspond to $\sqrt{I^2+Q^2}$, where I and Q are the In-phase and Quadrature components of the modulation in the IQ-plane shown in FIG. 1. In the modulator trajectories shown below the 8PSK peak amplitude is the same as the GMSK peak (and rms) amplitude. Therefore the 8PSK rms amplitude will be less than that of GMSK in this case. This is also true when burst data bits are all 1's in both modulations, which is the case during power ramping between bursts where guard bits (user defined as all 1's) are modulated.

At the instant where the modulation type changes, the transition may cause a zero-crossing through the origin of the IQ-plane, because the (I,Q) vector at the end of the previous slot is switched instantaneously to the (I,Q) reset vector of the modulation type in the next slot. In practice, zero crossing in the IQ-plane can cause power amplifier nonlinearity or desaturation. It can deteriorate RF/PA (radio frequency power amplifier) performance and should be avoided.

In the prior art, solutions to this problem rely on reducing the power level of the power amplifier circuit to mask or attenuate such transitions without addressing the problem of the transitions themselves.

Therefore, a need has arisen for a modulator that avoids zero crossings in the IQ-plane when switching between modulation types, for example, between GMSK to 8PSK or between 8PSK to GMSK.

BRIEF SUMMARY OF THE INVENTION

In the present invention, data is selectively modulating in a first modulation type or a second modulation-type, where modulation-types can be changed between slots. Smoothing changes between slots of different modulation types by determining a zone associated with a current position in an IQ plane at a predetermined point of modulation, jumping to a safe point associated with the zone and modulating from the safe point to a starting point prior to modulating data in a next slot.

The present invention eliminates the possibility of passing through a zero crossing during a switch between modulation types, thereby eliminating the problems associated with power amplifier circuits during a switch.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which:

FIG. 3b illustrates a flow chart describing operation of the modulation circuit of FIG. 3a;

FIG. 6b illustrates a graph of amplitude corresponding to the transition of FIG. 6a;

FIG. 7b illustrates a graph of amplitude corresponding to the transition of FIG. 7a.

DETAILED DESCRIPTION OF THE INVENTION

Figure 1:
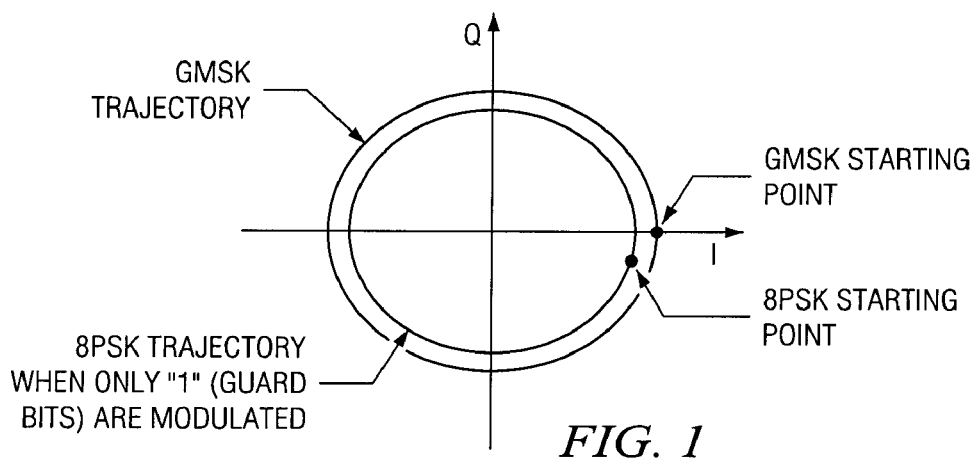
FIG. 1 illustrates trajectories for GMSK and 8PSK modulation types.

The present invention is best understood in relation to FIGS. 1-7a-b of the drawings, like numerals being used for like elements of the various drawings.

The present invention provides a dual-mode modulator with transition smoothing circuitry that avoids zero-crossing in the IQ-plane during transition between modulation types.

In the GSM05.02 specification (Section 5.2), each slot contains 156.25 symbols (156.25 bits for GMSK and 468.75 bits for 8PSK). For GMSK, this means that each slots holds 142 bits of data, 6 tail-bits and 8.25 guard bits. For 8PSK, each slot holds 426 bits of data, 18 tail bits and 24.75 guard bits. Table 1 specifies the tail bits and guard bits for GMSK and 8PSK.

TABLE 1

Tail bits and Guard Bits for GMSK and 8PSK

| Modulation | GMSK Bits | Bit Value | 8PSK Bits | Bit Value |
|---|---|---|---|---|
| Tail bits (1) | B0 to B2 | {0,0,0} | B0-B8 | {1,1,1,1,1,1,1,1,1} |
| Tail bits (2) | B145 to B147 | {0,0,0} | B435-B443 | {1,1,1,1,1,1,1,1,1} |
| Guard bits | B148 to B156 | User defined | B444-B468 | User defined |

It will be assumed that the guard bits for both GMSK and 8PSK are selected to be all 1s.

To provide smoothing, the following method is used. When the modulation type is changed in a multi-slot modulation, the modulation of the last symbol of the previous slot will be replaced modulation that will be controlled by a smoothing circuit during the time of the final symbol of the previous slot to effect the trajectory smoothing. For GMSK, each symbol is one bit, so the last guard bit of the slot is replaced. For 8PSK, each symbol is three bits, so the last three bits are replaced.

Figure 2:
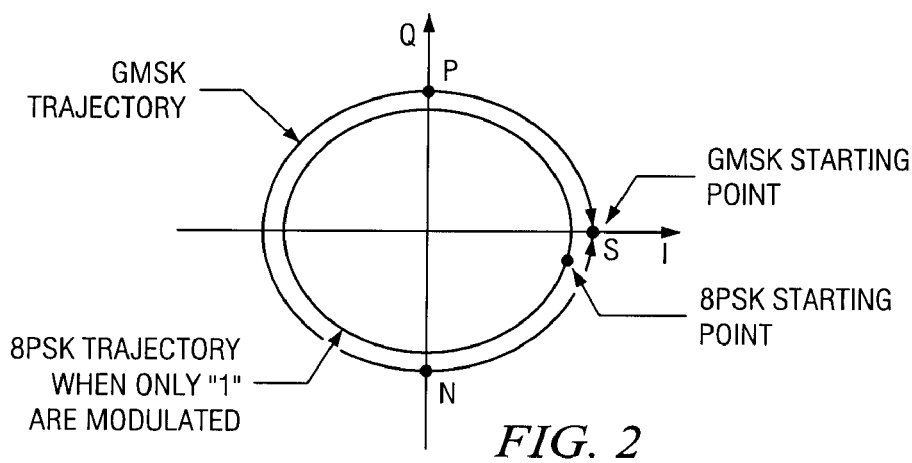
FIG. 2 illustrates safe points used for smoothing transitions in an multi-slot modulator.

As shown in FIG. 2, for GMSK modulation, the I-Q diagram trajectory is on a circle; for 8PSK modulation, when 1's are modulated, the I-Q diagram trajectory is on another circle with smaller amplitude. The slot starts and finishes with guard bits that are user defined. If guard bits are 1's, then the transition between two modulations is the pass from one circle to the other.

Referring to FIG. 2, the smoothing circuit effects the following events. If the modulation is in the positive half plane just prior to modulating the last symbol of the slot (i.e., Q>0), the last symbol of the slot is replaced with the smoothing data such that the modulation is made to jump to point P at [0,1] on the circle (where the maximum amplitude of the modulation-types are normalized to 1). Then, by modulating 1's using GMSK modulation, the quarter circle from point P to point S is traversed. From point S, data in the new slot is modulated using the new modulation type (GMSK or 8PSK).

On the other hand, if the modulation is in the negative half plane just prior to modulating the last symbol of the slot (i.e., Q<0), the last symbol of the slot is replaced with a smoothing data such that the modulation progresses to point N a [0,−1] on the circle. Then, by modulating 1's using GMSK modulation, the quarter circle from point N to point S is traversed. From point S, data in the new slot is modulated using the new modulation type (GMSK or 8PSK).

Figure 3A:
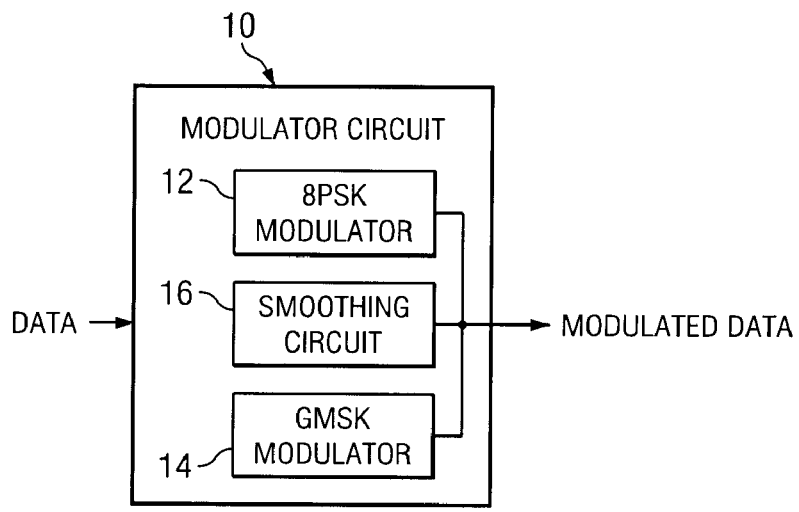
FIG. 3a illustrates a modulation circuit including a smoothing circuit.

FIG. 3a illustrates a block diagram of a modulation circuit 10 supporting multi-slot operation, such as described in the GPRS specification. The modulator is capable of modulating in either of two modulation-types, shown as an 8PSK modulator 12 and a GMSK modulator 14 (although other modulation-types such as QPSK could be used as well). A smoothing circuit performs the operations to modulate to a safe spot (P or N in FIG. 2) during the last symbol of a slot, where the modulation-type is scheduled to switch on the next slot.

Figure 3B:
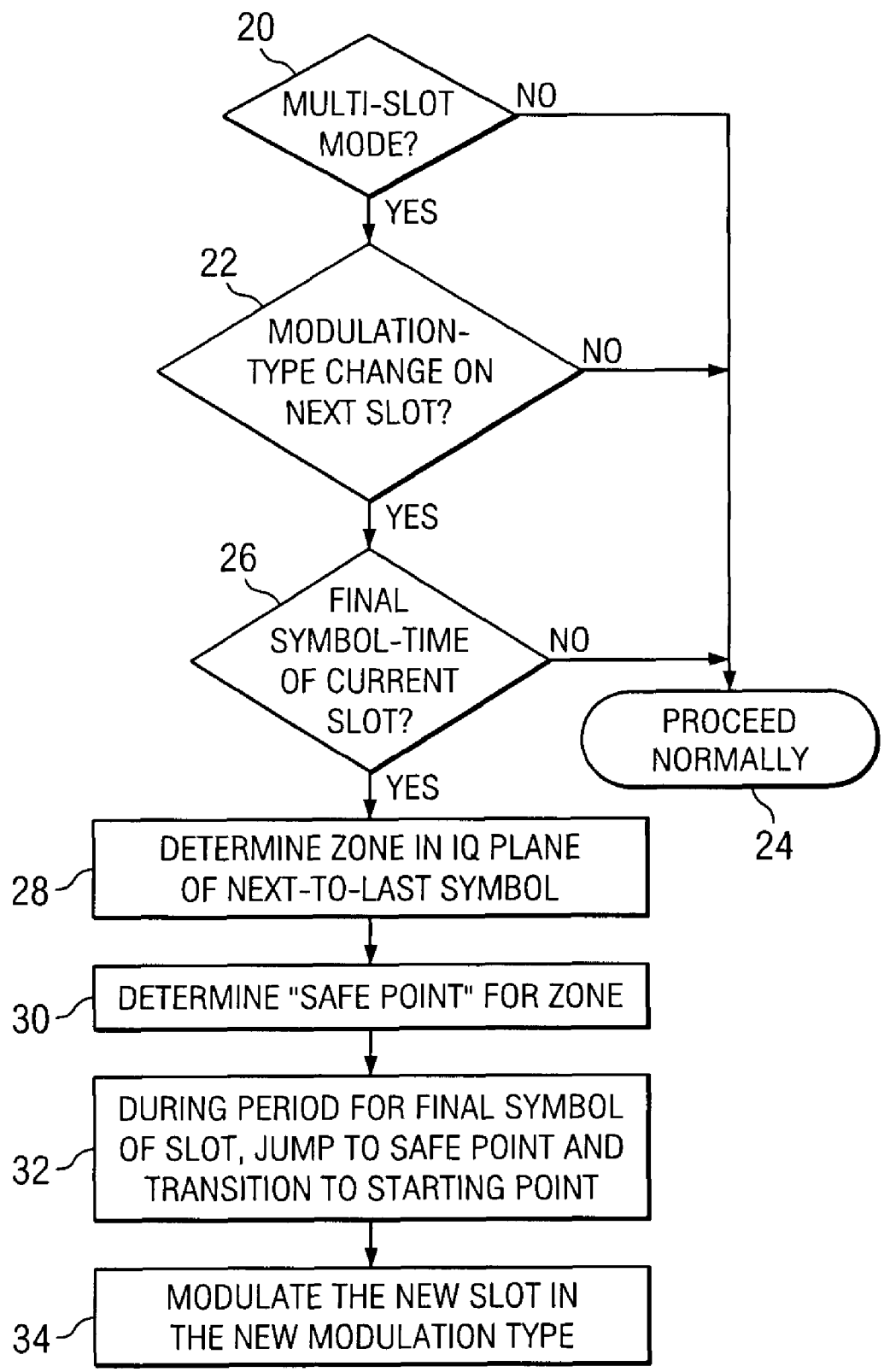

The operation of the modulation circuit is described in greater detail in connection with FIG. 3b. In steps 20 and 22, if the modulation is not in multi-slot mode or there is no modulation-type change on the next slot, then modulation proceeds as normal in block 24. Similarly, modulation proceeds as normal if the time for the last symbol of the current slot has not been reached in block 26.

If, however, the modulation is in multi-slot mode and the modulation-type is to be changed with the next slot and the time of the final symbol has been reached in block 26, then the smoothing circuit makes a jump to a safe point depending upon the current zone of the modulator in the IQ plane (steps 28 through 32). In the preferred embodiment, the zone is determined by whether Q for the last symbol to be modulated (i.e., the next-to-last symbol of the current slot) is positive or negative. In FIG. 2, safe point P is at (0, 1) and safe point N is at (0, −1). The safe points could be at different locations so long as the path from any point in the associated zone to the safe point does not come near the zero crossing. From the safe point, modulation using 1's traverses the quarter circle back to the GMSK starting point. In step 34, data from the new slot is modulated in using the new modulation type.

Figure 4C:
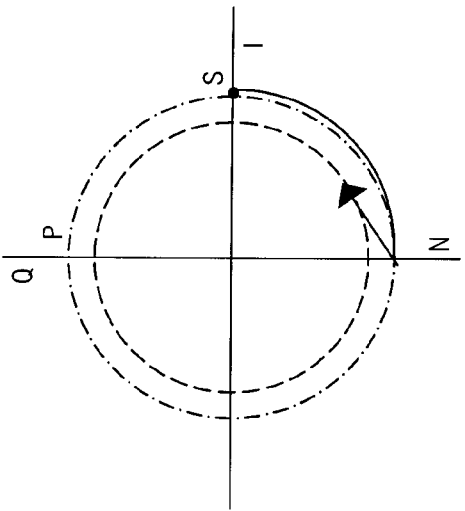
FIGS. 4a through 4c illustrates examples of the smoothing operation on transitions between 8PSK and GMSK modulation types.
Figure 4B:
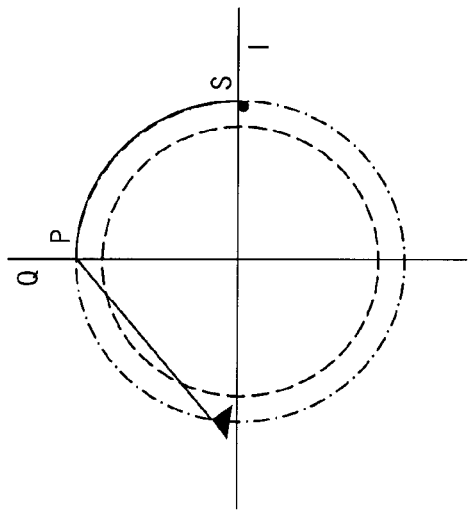
Figure 4A:
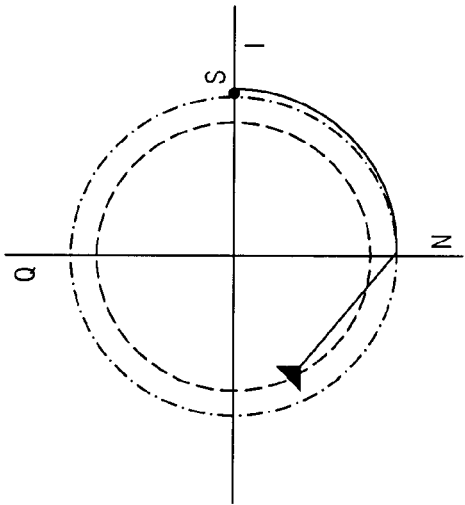

Examples of the smoothing operation for switching from 8PSK to GMSK are shown in FIGS. 4a-c. In FIG. 4a, the modulation of the next to last symbol in an 8PSK modulated slot ends at the arrow point. Since Q is negative at this point in the modulation, the safe point is N. The modulation jumps to point N (it should be noted that this jump cannot come near the origin from any point in the zone). Then, using GMSK modulation of 1's, the quarter circle is traversed to the starting point S. Modulation of data from the new slot can take place from this point using GMSK modulation.

In FIG. 4b, the modulation of the next to last symbol in an 8PSK modulated slot has a positive Q; thus, the safe point is P. The modulation jumps to point P and, using GMSK modulation of 1's, the quarter circle is traversed to the starting point S. Modulation of data from the new slot can take place from this point using GMSK modulation.

In FIG. 4c, the modulation of the next to last symbol in an 8PSK modulated slot has a negative Q; thus, the safe point is N. As compared to FIG. 4a, this point has a positive I. The modulation jumps to point N and, using GMSK modulation of 1's, the quarter circle is traversed to the starting point S. Modulation of data from the new slot can take place from this point using GMSK modulation.

Figure 5C:
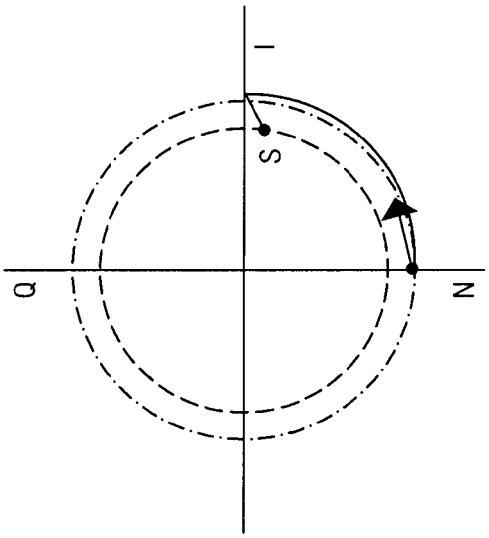
FIGS. 5a through 5c illustrates examples of the smoothing operation on transitions between GMSK and 8PSK modulation types.
Figure 5B:
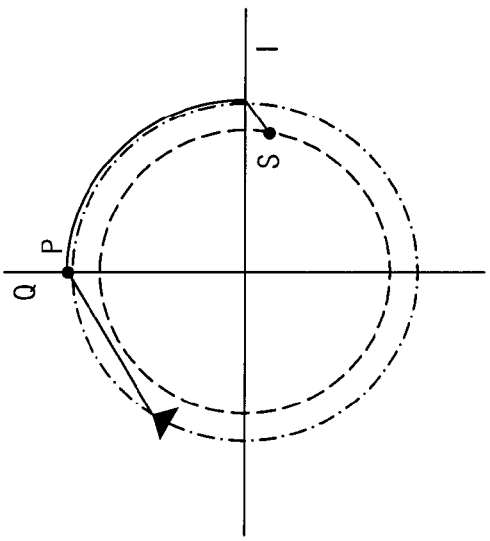
Figure 5A:
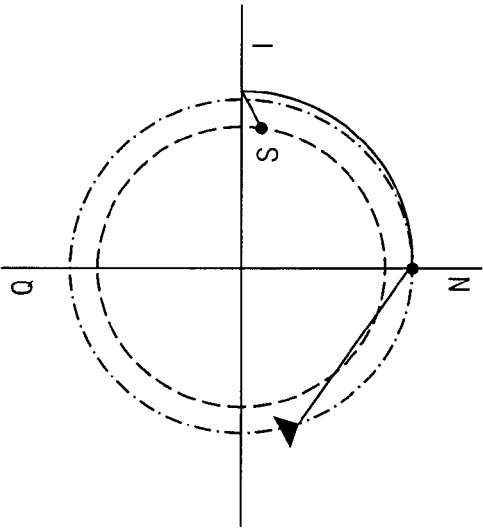

Examples of the smoothing operation for switching from GMSK to 8PSK are shown in FIGS. 5a-c. In FIG. 5a, the modulation of the next to last symbol in a GMSK modulated slot ends at the arrow point. Since Q is negative at this point in the modulation, the safe point is N. The modulation jumps to point N. Then, using GMSK modulation of 1's, the quarter circle is traversed to the starting point S. Modulation of data from the new slot can take place from this point using 8PSK modulation.

In FIG. 5b, the modulation of the next to last symbol in a GMSK modulated slot has a positive Q; thus, the safe point is P. The modulation jumps to point P and, using GMSK modulation of 1's, the quarter circle is traversed to the starting point S. Modulation of data from the new slot can take place from this point using 8PSK modulation.

In FIG. 5c, the modulation of the next to last symbol in a GMSK modulated slot has a negative Q; thus, the safe point is N. The modulation jumps to point N and, using GMSK modulation of 1's, the quarter circle is traversed to the starting point S. Modulation of data from the new slot can take place from this point using 8PSK modulation.

Figure 6A:
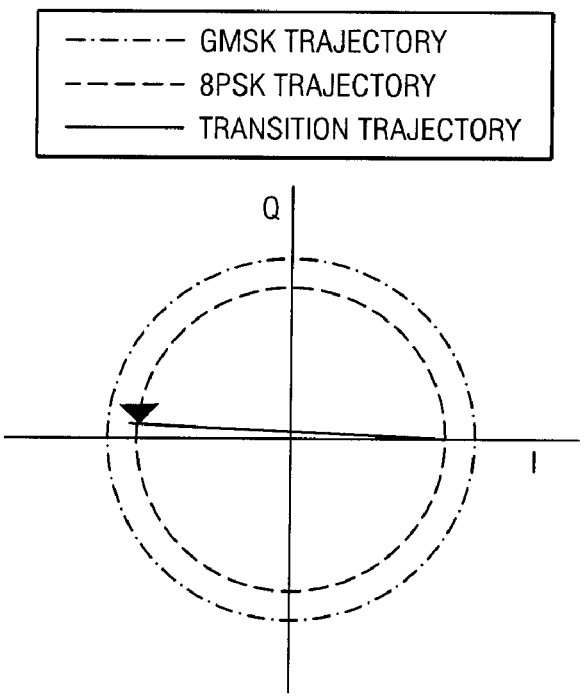
FIG. 6a illustrates an 8PSK to GMSK transition without smoothing.
Figure 6B:
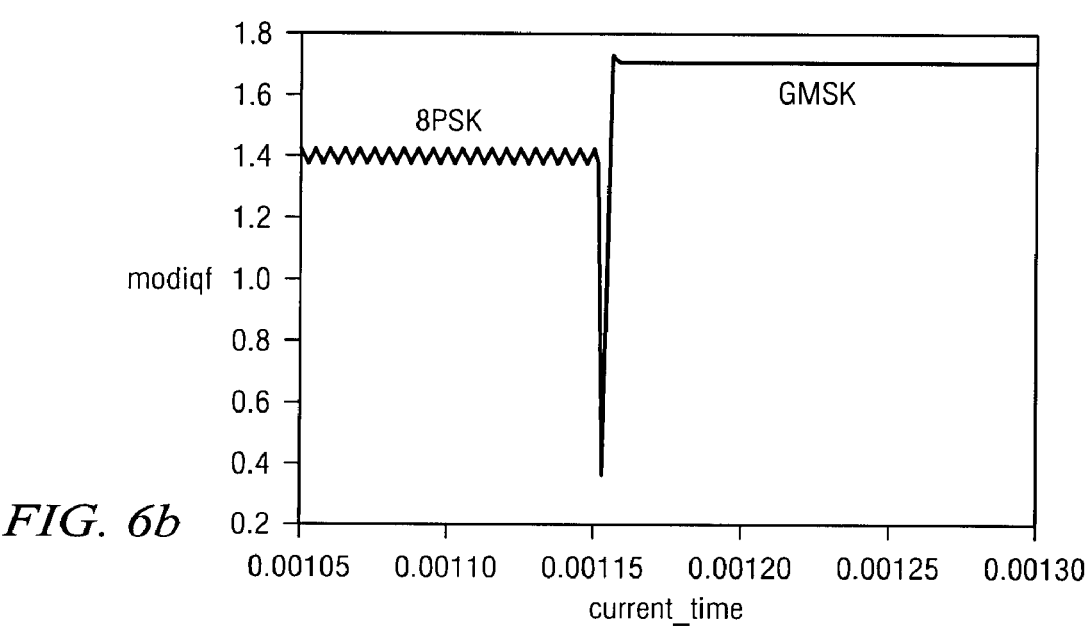
Figure 7A:
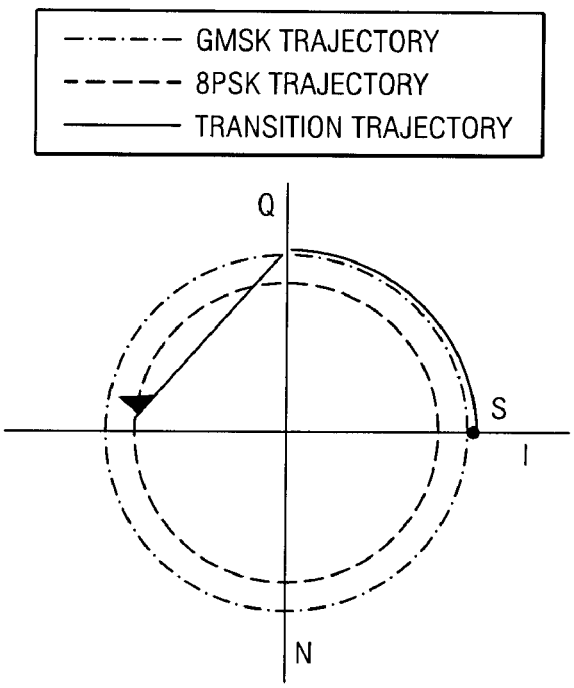
FIG. 7a illustrates an 8PSK to GMSK transition with smoothing.
Figure 7B:
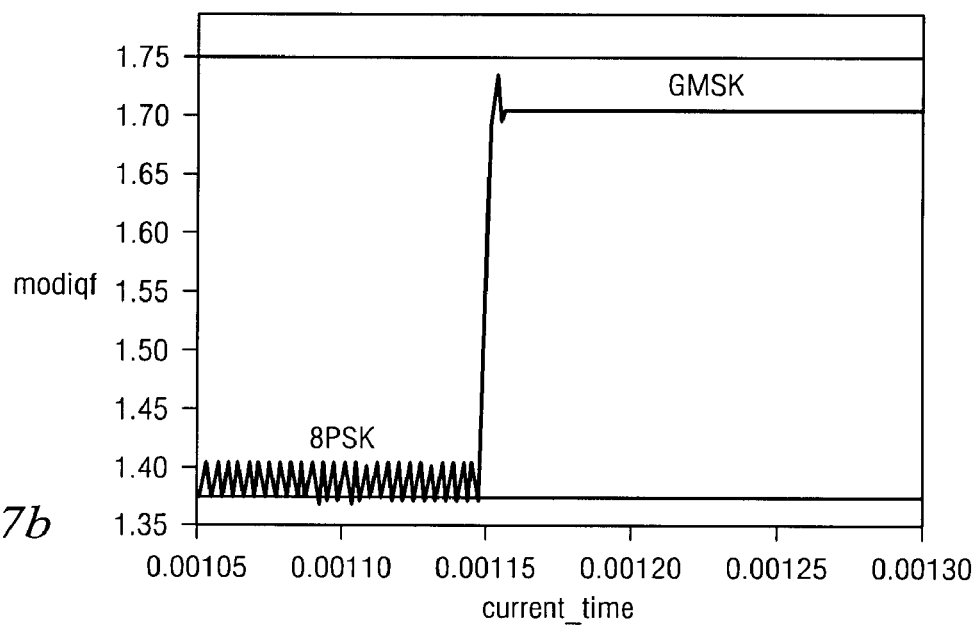

FIGS. 6a and 6b illustrate a transition from 8PSK to GMSK without the smoothing operation. FIG. 6a illustrates an eye diagram of a transition between an 8PSK modulation with a slightly positive Q to a GMSK modulation. As can be seen, the transition crosses very close to the origin of the IQ plane. As can be seen in FIG. 6b, the amplitude at the point of transition spikes downward to almost zero. By contrast, the same transition is shown in FIGS. 7a and 7b, with the smoothing operation. In this case, there is only a slight amount of noise at the transition.

The present invention provides significant improvement over the prior art. Rather than adjusting the power amplifier to compensate for problems caused by modulation-type transitions, the present invention provides smooth transitions during the time of the last symbol for a slot by jumping to a safe point, where the jump cannot incur a zero crossing. From the safe point, the quarter circle is traversed to the starting point.

While the present invention is described in relation to 8PSK and GMSK modulation-types, other modulation types, such as QPSK could also be used as one of the modulation-types.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the Claims.

The invention claimed is:

1. A modulation circuit for modulating data comprising:
a first modulator for modulating data in a first modulation type;
a second modulator for modulating data in a second modulation-type, the modulation-types being changeable between slots;
smoothing circuitry, coupled to the first and second modulators, for:
determining a zone associated with a current position in an IQ plane at a predetermined point of modulation;
jumping to a safe point associated with the zone; and
modulating from the safe point to a starting point prior to modulating data in a next slot.

2. The modulation circuit of claim 1 wherein said first modulation type is an 8PSK modulation-type and the second modulation-type is a GMSK modulation-type.

3. The modulation circuit of claim 2 wherein the smoothing circuitry modulates from the safe point to a starting point by using GMSK modulation.

4. The modulation circuit of claim 3 wherein the smoothing circuitry modulates from the safe point to a starting point by modulating 1's using GMSK modulation.

5. The modulation circuit of claim 1 wherein one of the first or second modulation-types is a QPSK modulation-type.

6. The modulation circuit of claim 1 wherein said smoothing circuitry is enabled only when the modulation circuit is in multi-slot mode.

7. The modulation circuit of claim 1 wherein a first zone includes points in the IQ plane where Q>0 and a second zone includes points in the IQ plane where Q<0.

8. The modulation circuit of claim 7 wherein the safe point in the first zone is at [0,1] in the IQ plane and the safe point in the second zone is at [0,−1] in the IQ plane, where the maximum amplitude of either modulation-type is normalized to 1.

9. The modulation circuit of claim 1 wherein the smoothing circuitry jumps to the safe point and transitions to the starting point during the time period associated with modulating the last guard symbol of a slot.

10. A method for modulating data in an apparatus, comprising the steps of:
selectively modulating data in a first modulation type or a second modulation-type, where modulation-types being changeable between slots;
smoothing changes between slots of different modulation types by:
determining a zone associated with a current position in an IQ plane at a predetermined point of modulation;
jumping to a safe point associated with the zone; modulating from the safe point to a starting point prior to modulating data in a next slot.

11. The method of claim 10 wherein said first modulation type is an 8PSK modulation-type and the second modulation-type is a GMSK modulation-type.

12. The method of claim 11 wherein the step of modulating from the safe point to a starting point is performed using GMSK modulation.

13. The method of claim 12 wherein the step of modulating from the safe point to a starting point is performed by modulating 1's using GMSK modulation.

14. The method of claim 10 wherein one of the first or second modulation-types is a QPSK modulation-type.

15. The method of claim 10 wherein said smoothing step is enabled only when multi-slot mode is enabled.

16. The method of claim 10 wherein a first zone includes points in the IQ plane where Q>0 and a second zone includes points in the IQ plane where Q<0.

17. The method of claim 16 wherein the safe point in the first zone is at [0,1] and the safe point in the second zone is at [0,−1].

18. The modulation circuit of claim 10 wherein the smoothing step is performed during the time period associated with modulating the last guard symbol of a slot.

* * * * *